US012497765B2

(12) United States Patent
Albers et al.

(10) Patent No.: US 12,497,765 B2
(45) Date of Patent: Dec. 16, 2025

(54) WATER SUPPLY AND DISTRIBUTION SYSTEM ON-BOARD AN AIRCRAFT AND METHOD FOR OPERATING SUCH SYSTEM

(71) Applicant: Airbus Operations GmbH, Hamburg (DE)

(72) Inventors: Frederik Albers, Hamburg (DE); Hannes Muller, Hamburg (DE); Frank Schneider, Hamburg (DE); Michael Rempe, Hamburg (DE); Tim Lubbert, Hamburg (DE); Axel Schreiner, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 104 days.

(21) Appl. No.: 18/545,678

(22) Filed: Dec. 19, 2023

(65) Prior Publication Data
US 2024/0200312 A1 Jun. 20, 2024

(30) Foreign Application Priority Data
Dec. 20, 2022 (EP) .................................... 22215099

(51) Int. Cl.
*E03B 7/07* (2006.01)
*B64D 11/02* (2006.01)
(52) U.S. Cl.
CPC .............. *E03B 7/075* (2013.01); *B64D 11/02* (2013.01)
(58) Field of Classification Search
CPC ................................ E03B 7/075; B64D 11/02
See application file for complete search history.

(56) References Cited

U.S. PATENT DOCUMENTS 5,261,440 A * 11/1993 Frank ..................... B64D 11/02
                                                    137/208
5,303,739 A *  4/1994 Ellgoth .................. B64D 11/02
                                                    137/341

(Continued)

FOREIGN PATENT DOCUMENTS

| EP | 3385361 A1 | 10/2018 |
| EP | 3738880 A1 | 11/2020 |
| EP | 4080297 A1 | 10/2022 |

OTHER PUBLICATIONS

European Search Report for Application No. 22215099 dated May 26, 2023.

*Primary Examiner* — Reinaldo Sanchez-Medina
(74) *Attorney, Agent, or Firm* — KDW Firm PLLC (57) ABSTRACT

A method for operating an on-board water supply and distribution system of an aircraft for supplying water includes a central water tank, central pump, having an upstream side and a downstream side for conveying and pressurizing water from the upstream side to the downstream side, consumer assemblies including a supply device and a buffer tank including a pressurizing device. A high-pressure conduit system connects the downstream side with the consumer assemblies and is configured where the central pump operating can deliver water from the downstream side to the buffer tank of each of the consumer assemblies. The method includes operating the central pump where water is pressurized to a first pressure, monitoring pressure in the high-pressure conduit system for a first period of time, and providing a first failure signal when pressure in the high-pressure conduit system drops below a second pressure within the first period of time.

17 Claims, 4 Drawing Sheets

(56) References Cited

U.S. PATENT DOCUMENTS

| | | | |
|---|---|---|---|
| 10,590,634 B2* | 3/2020 | Giamati | B64D 11/04 |
| 11,022,517 B2* | 6/2021 | Maroju | G01M 3/36 |
| 2006/0260691 A1 | 11/2006 | Davidoff | |
| 2012/0111432 A1* | 5/2012 | Harr | B64D 11/02 |
| | | | 137/590 |
| 2014/0158242 A1* | 6/2014 | Schreiner | E03B 7/09 |
| | | | 60/785 |
| 2018/0291595 A1 | 10/2018 | Lubbert | |
| 2022/0064039 A1* | 3/2022 | Nakama | E03D 9/02 |

* cited by examiner

WATER SUPPLY AND DISTRIBUTION SYSTEM ON-BOARD AN AIRCRAFT AND METHOD FOR OPERATING SUCH SYSTEM

TECHNICAL FIELD

The disclosure herein is directed to a method for operating a water supply and distribution system on-board an aircraft. The disclosure herein is further directed to a water supply and distribution system for an aircraft.

BACKGROUND

Conventional water supply and distribution systems on-board commercial aircraft comprise pipework made from rigid pipes, i.e., rigid plumbing. Through the rigid pipes potable water is supplied from a central water tank towards consumer assemblies such as sinks and toilets in a lavatory or steam ovens and sinks in a galley.

However, recently a high-pressure water system was introduced, and it is described in EP 3 385 361 A1. Such industry-optimized water system architecture is based on the concept of a reduction of pipe cross-sections accompanied by an increase in pressure level as well as a change of pressurization technology, i.e., rather than employing pressurized central water tanks, displacement pumps are used, but other types of pumps may also be used in such high-pressure systems. With such pumps water in a so-called high-pressure conduit system downstream the pump is pressurized and conveyed at such increased pressures. This adaption allows massive savings, e.g., weight, installation time, equipment cost etc.

In any kind of water supply system but especially in case of those pressurized systems there is the risk that due to leaks in the monuments and the high-pressure conduit system large amounts water may escape into areas of the aircraft such as spaces behind claddings or below floor elements where the components of the conduit system are installed, where even large amounts or accumulations of water cannot be discovered without disassembling claddings or floor components. Similarly, visual inspection of the high-pressure conduit system and the components of it in monuments also require the disassembly of the floor or the cladding members which in turn requires a lot of efforts.

Furthermore, leaking water can, for example, damage sensitive electronic equipment which is especially critical regarding safety when the avionics bay is affected, because this area houses the flight control computers. In addition, large amounts of water mean a lot of weight, which can have a safety-relevance since it results in a shift in the center of gravity of the entire aircraft. Especially, in permanent cold-weather operation, when the drainage openings in the aircraft fuselage cannot drain the leaking water, an ice shell can form in the aircraft bilge over several legs, which can have a mass of several hundred kilograms.

SUMMARY

Hence, it is an object of the disclosure herein to provide for monitoring the integrity of the water supply system during operation without the need to disassemble components of the interior of the aircraft.

The aforementioned object underlying the disclosure herein is solved by a method for operating an on-board water supply and distribution system of an aircraft for supplying water, the system comprising a central water tank, a central pump, having an upstream side and a downstream side and being capable of conveying and pressurizing water from the upstream side to the downstream side, a plurality of consumer assemblies, each consumer assembly comprising a supply device, such as faucets, toilet rinse valves, coffee machines, steam ovens in galley etc., and a buffer tank, wherein the buffer tank of each of the consumer assemblies comprises a pressurizing device configured for applying a consumer pressure to the water kept in the buffer tank, and each consumer assembly being configured to supply water from the buffer tank via the supply device, and a high-pressure conduit system, wherein the central water tank is connected to the upstream side, wherein the high-pressure conduit system connects the downstream side with the plurality of consumer assemblies, with the high-pressure conduit system being configured such that the central pump, when operating is capable of delivering water from the downstream side to the buffer tank of each of the consumer assemblies, the method comprising the following steps:

operating the central pump such that water in the high-pressure conduit system is pressurized to a predetermined first pressure;

monitoring the pressure in the high-pressure conduit system for a predetermined first period of time; and providing a first failure signal when the pressure in the high-pressure conduit system drops below a predetermined second pressure within the first period of time.

Thus, the method of the disclosure herein is performed with a pressurized on-board water supply and distribution system comprising a central water tank, a central pump and a plurality of consumer assemblies comprising a buffer tank and a supply device.

Here, it is to be noted that it is preferred that either the central pump is provided with a backflow prevention mechanism, which prevents water and/or a gas to flow in an opposite direction from the downstream side to the upstream side when it is not operated, or an additional backflow prevention valve is provided which is closed, when the central pump is not operated and prevents water and/or a gas to flow from the downstream side to the upstream side.

Moreover, each of the buffer tanks is provided with a pressurization device configured for applying a consumer pressure to the water kept in the buffer tank. The pressurizing device allows to pressurize the water in the buffer tanks, so that the pressure level, the water in the buffer tanks has, is the aforementioned consumer pressure. The buffer tank with the pressurizing device may be configured such that the tank may hold both the water and a gas. In particular, the buffer tank may for example comprise a membrane that separates the inner volume of the buffer tank into two parts. Firstly, a receiving space is formed for receiving the water being supplied via the high-pressure conduit system. In addition, a gas volume is formed, that hold the gas which is compressed when the receiving space is filled with water, so that it acts as an elastic member that in turn pressurizes the water.

However, it is also conceivable that the buffer tank and/or the gas volume is coupled to a compressor that is controlled such that it pressurizes the gas volume to a predetermined pressure corresponding to the consumer pressure and also maintains this pressure.

When employing a compressor, it is not necessary, that the membrane is provided, which separates the inner volume of the buffer tank. In such case, the membrane may be omitted.

In addition to the above approaches, metallic or plastic bellows may be employed as passive pressurization devices. Alternatively, a spring-loaded piston applying pressure onto a volume connected to the space in the buffer tank receiving the water may also be employed. Moreover, such piston may also be loaded by a linear actuator, which is controlled in a corresponding manner.

Furthermore, other approaches to apply the consumer pressure to the water that is kept in the buffer tank are also conceivable, and the disclosure herein is not limited to the afore-mentioned examples.

Further, the consumer assemblies and especially its buffer tanks are connected with the central pump via the high-pressure conduit system.

It is also to be noted that the system in addition to the above-described consumer assemblies comprising pressurized buffer tanks may include further consumer assemblies that do not have buffer tanks being the pressurized or even buffer tanks at all. Hence, it is within the scope of the disclosure herein that the water supply system may comprise additional components not mentioned before. However, it is essential, that a plurality of consumer assemblies is provided having pressurized buffers tanks as described above.

In this respect, it is further to be noted that in a preferred embodiment the high-pressure conduit system comprises a pressure reservoir that is configured such that it applies a pressure at a reservoir pressure to the high-pressure conduit system after the operation of the central pump has been stopped with the reservoir pressure and the pressure in the high-pressure conduit system at that point in time where the central pump was stopped being the same. Such pressure reservoir may be in the form of a tank containing a gas volume and an elastic membrane that separates the gas volume from a further volume being connected to the high-pressure conduit system and receiving water and/or gas such as ambient air from the conduit system, i.e., the reservoir is configured in a similar form as the tank in conventional compressors. However, other configurations are conceivable as well. A component of the high-pressure conduit system having compressibility such the aforementioned pressure reservoir can also be generated by providing shape elasticity of a hose element of the high-pressure conduit system or other compressible elements with spring properties may be integrated into the high-pressure conduit system.

With the method of the disclosure herein is a first step that the central pump is operated such that the water in the high-pressure conduit system is pressurized to a predetermined first pressure.

In a preferred embodiment at least after this first pressure or a pressure level has been reached, the consumer assemblies are operated such that in each of the consumer assemblies the connection between the buffer tank of the consumer assembly and the high-pressure conduit system is brought in a closed position.

In parallel the pressure in the high-pressure conduit system is monitored for a first period of time. In case the pressure in the high-pressure conduit system drops below a predetermined second pressure within this first period of time, a first failure signal is provided. The provision of a failure signal may be in such a form that a control unit of the on-board water supply and distribution system generates such first failure signal which is then further provided to the aircraft data network of the aircraft in which the entire system is installed. In particular, due to the first failure signal a specific failure message may be displayed on control panels such as the flight attendant panel and/or the first failure signal will cause that the central pump of the water supply and distribution system will automatically be switched off.

In case the pressure in the high-pressure conduit system does not drop below the predetermined second pressure but stays above, in a preferred embodiment a test-passed signal will be generated by the control unit which signal may cause that a corresponding message will be displayed on the aforementioned panels. It is further preferred that this information is also stored onboard in the aircraft data base. This offers evidence for the maintenance staff when the system was tested successfully and when the system started to have a water leakage.

When performing the test as specified by the method of the disclosure herein, a drop of the water pressure in the high-pressure conduit system below the predetermined second pressure indicates that there is a leak in the high-pressure conduit system, i.e., with this procedure it can simply be determined whether there is a leak in the high-pressure conduit system. Water cannot escape from the high-pressure conduit system except there is a leak, so that in case the entire system is properly working, the water pressure in the system should remain constant above a certain level after an equilibrium level has been reached.

Thus, the method of the disclosure herein allows for quickly obtaining general information about the status of the water supply and distribution system without the need to disassembly components of a cladding or floor and to visually inspect the system.

In a preferred embodiment of the method of the disclosure herein, the consumer assemblies are operated such that for each of the consumer assemblies the connection between the buffer tank of the consumer assembly and the high-pressure conduit system is in an open position, wherein the pressures are monitored in the buffer tanks of each of the consumer assemblies after a second period of time and wherein a second failure signal is provided, when the difference between the monitored pressures in the buffer tanks of two consumer assemblies exceeds a first pressure difference.

Hence, in this preferred embodiment it is monitored, whether, when the connections between the buffer tanks and the high-pressure conduit system are in an open position for each of the consumer assemblies, the same pressure is reached after an equalization period. Should this not be the case, this indicates that the entire system is not running properly, i.e., certain sensors are not correctly working, which would be indicated by the second failure signal transmitted by the aircraft data network. In case identical pressure values are obtained, it is conceivable that a test-passed signal will be transmitted.

In another preferred embodiment the consumer assemblies are operated such that for each of the consumer assemblies the connection between the buffer tank of the consumer assembly and the high-pressure conduit system is in an open position, wherein the pressures are monitored in the buffer tanks of each of the consumer assemblies and in the high-pressure conduit system after a second period of time and wherein a second failure signal is provided, when the difference between the monitored pressure in the buffer tank of one of the consumer assemblies and the monitored pressure in the high-pressure conduit system exceeds a first pressure difference.

In this preferred embodiment it is monitored, whether when the connections between the buffer tanks and the high-pressure conduit system are in an open position for each of the consumer assemblies, that the same pressure is reached in the buffer tanks and the high-pressure conduit system after an equalization period. Should this not be the case, it also indicates that sensors are malfunctioning or that a leak is present.

In a further preferred embodiment of the method of the disclosure herein, the consumer assemblies are operated such that for the consumer assemblies the connections between the buffer tank and the high-pressure conduit system are subsequently brought in the open position so that at one point in time for only one of the consumer assemblies the connection between the buffer tank of the consumer assembly and the high-pressure conduit system is in an open position, whereas for the remaining consumer assemblies the connection between the buffer tank of the consumer assembly and the high-pressure conduit system is in a closed position, wherein for each of the consumer assemblies when the connection between the buffer tank and the high-pressure conduit system is in the open position, the pressure in the high-pressure conduit system is monitored for the predetermined first period of time, and wherein the first failure signal is provided, when for at least one of the consumer assemblies, the pressure in the high-pressure conduit system drops below the predetermined second pressure within the first period of time.

In this preferred embodiment of the method of the disclosure herein the connection between the central pump and the buffer tank of each of the consumer assemblies is subsequently checked. This allows to determine whether any of the paths between the central pump and the buffer tanks comprises a leak, which is indicated when the pressure which is monitored in the high-pressure conduit system or the buffer tank currently coupled with the high-pressure conduit system, drops below the second pressure within the first period of time.

In a further preferred embodiment, the first failure signal is provided, when for at least one of the consumer assemblies, the pressure in the high-pressure conduit system and in the buffer tank of that consumer assembly currently connected to the high-pressure conduit system differ by more than a second pressure difference after the first period of time. This allows to double check the pressure sensors in the high-pressure conduit system and the respective buffer tank. If the monitored pressures do not sufficiently match the first failure signal is provided.

Further, it can be distinguished between a sensor malfunction and a leak by monitoring the pressure by sensors at different positions after a predetermined time interval. When each of the sensors also indicate a lower pressure after the time interval, there must be a leak since they are fluidly connected. If the difference is still present after the interval, then a sensor error or malfunctioning must be the root cause.

In another preferred embodiment, the method of the disclosure herein comprises the following steps:
pressurizing gas, preferably ambient air, in the high-pressure conduit system to a predetermined third pressure, preferably by the central pump;
monitoring the pressure in the high-pressure conduit system for a predetermined third period of time; and
providing a third failure signal when the pressure in the high-pressure conduit system drops below a predetermined fourth pressure within the third period of time.

With this preferred embodiment the high-pressure conduit system, especially when in a preferred embodiment the connections between the buffer tank of the consumer assemblies and the high-pressure conduit system are in the closed position, can be checked as to whether it comprises a leak without having water in the system but performing in the test with gas such as ambient air as the medium in question. In this regard it is to be noted that the high-pressure conduit system as well as the central tank need to be drained.

Furthermore, it is to be noted that means other than the central pump may by employed as the source for pressurized gas. In particular, it is conceivable that a ground pressure source is used or that the high-pressure conduit system is configured such that it comprises an interface which can connected to an interface of the cabin pressurization system or, as an alternative, it may also be connected to an interface of the bleed air system.

In another preferred embodiment the consumer assemblies are operated such that for each of the consumer assemblies the connection between the buffer tank of the consumer assembly and the high-pressure conduit system is in an open position, wherein the pressures are monitored in the buffer tanks of each of the consumer assemblies after a fourth period of time, and wherein a fourth failure signal is provided, when the difference between the monitored pressures in the buffer tanks of two consumer assemblies exceeds a third pressure difference. With this preferred embodiment it is monitored, whether for each of the consumer assemblies, when the connections between the buffer tanks and the high-pressure conduit system are in an open position, the same gas pressure is reached after an equalization period. Should this not be the case, this indicates that the entire system is not running properly, i.e., certain sensors are not correctly working, which would be indicated by the fourth failure signal transmitted by the aircraft data network. In case an identical pressure values are obtained, it is conceivable that a test-passed signal will be transmitted.

In another preferred embodiment the consumer assemblies are operated such that for each of the consumer assemblies the connection between the buffer tank of the consumer assembly and the high-pressure conduit system is in an open position, wherein the pressures are monitored in the buffer tanks of each of the consumer assemblies and in the high-pressure conduit system after a fourth period of time and wherein a fourth failure signal is provided, when the difference between the monitored pressure in the buffer tank of one of the consumer assemblies and the monitored pressure in the high-pressure conduit system exceeds a fourth pressure difference.

In this preferred embodiment it is monitored, whether when the connections between the buffer tanks and the high-pressure conduit system are in an open position for each of the consumer assemblies, that the same gas pressure is reached in the buffer tanks and the high-pressure conduit system after an equalization period. Should this not be the case, it also indicates that sensors are malfunctioning or that a leak is present.

As an alternative to the aforementioned preferred embodiment, where the connections between the buffer tanks and the high-pressure conduit system are closed, it is also preferred that the consumer assemblies are operated such that for the consumer assemblies the connection between the buffer tank and the high-pressure conduit system are subsequently brought in the open position so that at one point in time for only one of the consumer assemblies the connection between the buffer tank of the consumer assembly and the high-pressure conduit system is in an open position, whereas for the remaining consumer assemblies the connection between the buffer tank of the consumer assembly and the high-pressure conduit system is in a closed position, wherein for each of the consumer assemblies, when the connection between the buffer tank and the high-pressure conduit system is in the open position, the pressure in the high-pressure conduit system is monitored for the predetermined third period of time, and wherein the third failure signal is provided, when for at least one of consumer assemblies, the pressure in the high-pressure conduit system or in the buffer tank of the at least one consumer assembly drops below the predetermined fourth pressure within the third period of time.

Hence, in this preferred embodiment the different paths from the central pump to each of the buffer tanks of the consumer assemblies are inspected as to whether a leak is present in the respective path. If the latter is the case, the gas pressure in the system will drop below the fourth pressure within the third period of time and a third failure signal will be provided and transmitted via the aircraft data network. In the alternative, in case no significant pressure drop occurs in the third period of time, again a test-passed signal may be provided.

In a further preferred embodiment, the third failure signal is provided, when for at least one of the consumer assemblies, the pressure in the high-pressure conduit system and in the buffer tank of that consumer assembly currently connected to the high-pressure conduit system differ by more than a predetermined pressure difference after the third period of time. This again allows to double check the pressure sensors in the high-pressure conduit system and the respective buffer tank. If the monitored pressures do not sufficiently match the third failure signal is provided.

In another preferred embodiment the method of the disclosure herein comprises the following steps:
  operating the central pump such that water is conveyed from the upstream side to the downstream side, into the high-pressure conduit system and into the buffer tank of at least one of the consumer assemblies;
  operating the at least one consumer assembly such that the connection between the buffer tank of the at least one consumer assembly and the high-pressure conduit system is brought in a closed position, wherein the water in the buffer tank of the at least one consumer assembly is kept at the consumer pressure by the pressurizing device;
  monitoring the pressure in the buffer tank of the at least one consumer assembly while the supply device of the at least one consumer assembly is kept in a closed position; and
  providing a fourth failure signal when the pressure in the buffer tank of the at least one consumer assembly drops below a predetermined fifth pressure below the consumer pressure within a fourth period of time.

In this preferred embodiment it is monitored whether the pressure in the buffer tank of at least one of the consumer assemblies is maintained and whether the pressure does not drop below the predetermined fifth pressure. In case the letter occurs, a fourth failure signal will be generated and transmitted which then indicates that the consumer assembly being provided with the buffer tank in question obviously comprises a leak. As a consequence, the respective monument having the consumer assemblies with the leak may be disconnected from the system by permanently closing the connection between the respective consumer assembly and the high-pressure conduit system. Similarly, as in the aforementioned embodiments, in case no significant pressure drop is detected in the fourth period of time, a test-passed signal may be provided and transmitted to the control unit via the aircraft data network.

In another preferred embodiment of the disclosure herein, the pressurizing devices of the consumer assemblies are further configured for increasing a pressure of the water in the buffer tanks to an operating pressure and the pressure of the water at the operating pressure when water is or has been drained from the buffer tank, wherein the method further comprises the following steps:
  operating at least one consumer assembly for a predetermined time interval such that the pressurising device of the at least one consumer assembly increases the pressure in the buffer tank of the at least one consumer assembly towards the operating pressure, while the supply device of the at least one consumer assembly is in the closed position, and that the connection between the buffer tank of the at least one consumer assembly and the high-pressure conduit system is in the closed position;
  monitoring the pressure in the buffer tank of the at least on consumer assembly after expiry of the time interval; and
  providing a fifth failure signal when the pressure in buffer tank of the at least one consumer assembly is below the operating pressure after expiry of a fifth period of time by more than a predetermined value.

In this preferred embodiment the pressurizing device is configured such that it is capable of increasing the pressure of the water in the buffer tanks to an operating pressure. In such case this preferred embodiment at least one of the consumer assemblies is operated such that the pressure of the water in its buffer tank is increased to the operating pressure for a predetermined period of time. After the pressurizing device has been switched off, the pressure in the buffer tank is monitored and in case it drops below the operating pressure by more than a threshold, namely by more than the predetermined value, a fifth failure signal will be sent through the aircraft data network. In case such drop does not occur, a test-passed signal may be generated.

In another preferred embodiment, the method of the disclosure herein further comprises the following steps:
  operating the central pump such that water is conveyed from the upstream side to the downstream side, into the high-pressure conduit system and into the buffer tank of at least one of the consumer assemblies;
  monitoring whether the level in the buffer tank of the at least one consumer assembly exceeds a predetermined second filling level;
  stopping operation of the central pump or closing the connection between the at least one consumer assembly and the high-pressure conduit system, when the level in the buffer tank of the at least one consumer assembly has exceeded the predetermined second filling level;
  monitoring whether the level in the buffer tank (41) of the at least one of the consumer assembly falls below a predetermined second filling level; and
  providing a seventh failure signal when the level in the buffer tank (41) of the at least one the consumer assembly (5) has fallen below the predetermined second filling level within a predetermined seventh period of time.

In this preferred embodiment the buffer tank of one of the consumer assemblies is initially filled up to a predetermined first filling level, and when this level has been reached, the central pump is switched off or the connection between the at least one consumer assembly and the high-pressure conduit system is closed, e.g., by closing an inlet valve, i.e., preferably an inlet valve connecting the buffer tank of this consumer assembly and the high-pressure conduit system, and the respective supply device is closed, when the first predetermined filling level has been reached. In the following, the level in the buffer tank is monitored, and when the level in the respective buffer tank falls below a predetermined second filling level, a seventh failure signal is provided to the aircraft data network and treated correspondingly. The seventh failure signal is generated because a decrease of the level in one of the buffer tanks even though the supply device and the inlet valve are closed, indicates that the respective consumer assembly is malfunctioning and comprises a leak. In addition, in case the level in the buffer tank stays above the second filling level within the seventh period of time, again a test-passed signal may be generated and transmitted via the aircraft data network.

With regard to the disclosure herein and the preferred embodiments explained above it is to be noted that although some embodiments are merely described as being preferred, they are to be considered as a disclosure herein even when taken in isolation.

BRIEF DESCRIPTION OF DRAWINGS

Moreover, the above object is solved by an onboard water supply and distribution system of an aircraft which is configured to perform any of the above methods.

In the following, the disclosure herein will further be described with regard to the example embodiment shown in the drawings, wherein.

DETAILED DESCRIPTION

Figure 1:
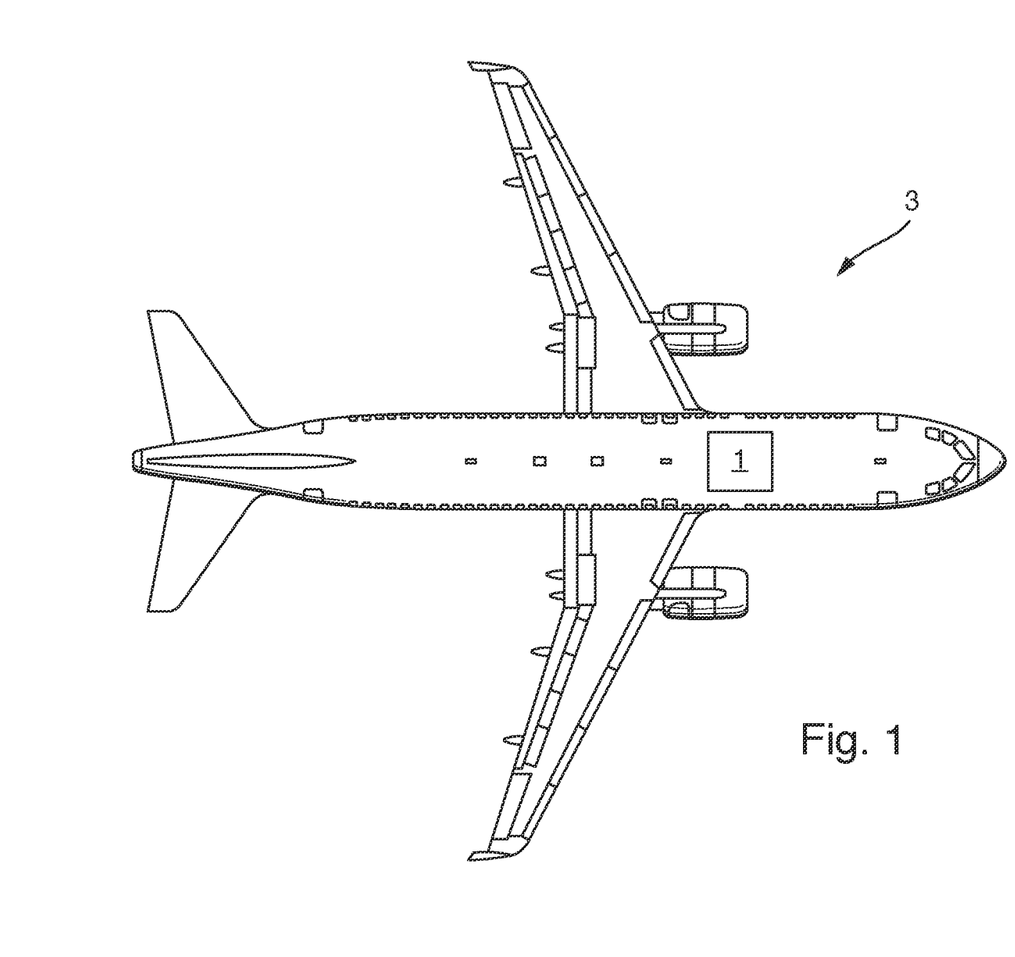
FIG. 1 shows an example embodiment of an aircraft having an on-board water supply and distribution system.
Figure 2:
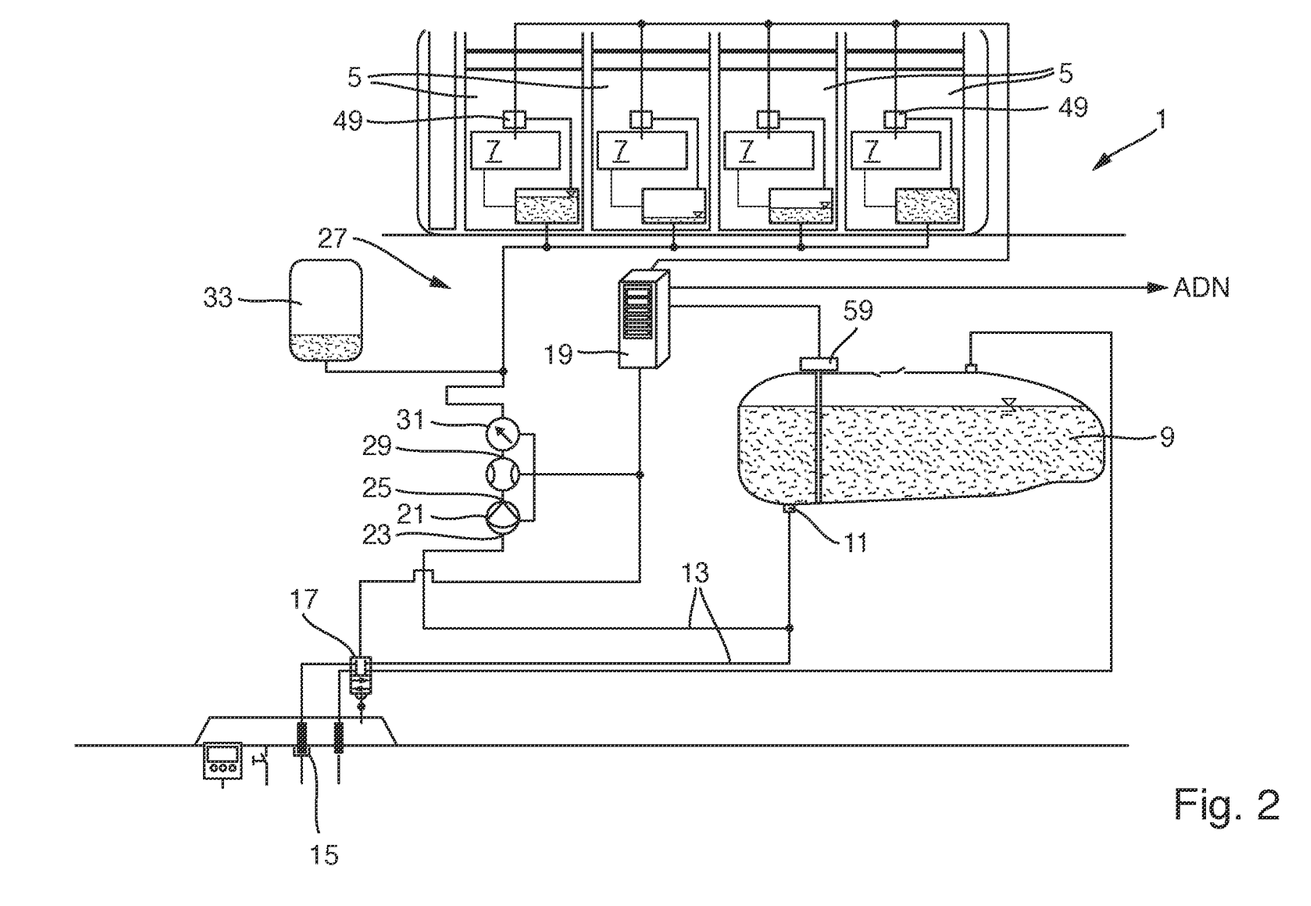
FIG. 2 shows a schematic drawing of an example embodiment of an on-board water supply and distribution system of an aircraft.

As can be taken from FIGS. 1 and 2 the example embodiment of a water supply and distribution system 1 is generally arranged on-board an aircraft 3 and configured such that it supplies a plurality of consumer assemblies 5 which comprise supply devices 7 such as sinks and toilets in a lavatory or steam ovens and sinks in a galley, with potable water as will be described in detail below. FIG. 1 only schematically shows the arrangement of the system 1 in the aircraft 3, and several types of arrangements are conceivable.

The water supply and distribution system 1 comprises a central water tank 9 which is provided with a connector 11 at its bottom. The connector 11 is connected to a supply line 13 which extends to a fill/drain coupling 15 with a valve 17 being arranged in the supply line 13 adjacent to the fill/drain coupling 15. The valve 17 is connected to a control unit 19 of the system 1 and can remotely be controlled such that it can be switched between a closed and an open position. As can further be taken from FIG. 1, the supply line 13 also connects the connector 11 with a central pump 21. Preferably, the central pump 21 is configured as a positive displacement pump and further preferred as a gear pump.

Furthermore, the central pump 21 is also connected to the control unit 19 and can be operated in a supply mode where it conveys and pressurizes water or other media such as ambient air from its upstream side 23 and the supply line 13 to its downstream side 25 that is connected to a high-pressure conduit system 27 which will be described in detail below. The downstream side 25 of the central pump 21 is equipped with a flow sensor 29 and a pressure sensor 31 which are both connected with the control unit 19 and which are capable of monitoring the flow rate of the water conveyed by the central pump 21 and the pressure the water supplied by the pump 21 has.

In addition, it is to be noted that it is preferred that either the central pump 21 is provided with a backflow prevention mechanism (not shown), which prevents water and/or a gas to flow in an opposite direction from the downstream side 25 to the upstream side 23 when the pump 21 is not operated, or an additional backflow prevention valve (not shown) is provided which is closed, when the central pump 21 is not operated and prevents water and/or a gas to flow from the downstream side 25 to the upstream side 23.

The high-pressure conduit system 27 comprises a plurality of conduits connecting the downstream side 25 of the central pump 21 with the consumer assemblies 5. In addition, in this preferred embodiment, the high-pressure conduit system 27 comprises a pressure reservoir 33 that is configured such that that it applies a pressure at a reservoir pressure level to the high-pressure conduit system 27. The reservoir pressure level being the level the pressure has after operation of the central pump 21 has been stopped so that the reservoir pressure level is the level the pressure in the high-pressure conduit system 27 has at that point in time where the central pump 21 was stopped. The pressure reservoir 33 can be in the form of a tank containing a gas volume and an elastic membrane that separates the gas volume from a further volume being connected to the high-pressure conduit system and receiving water and/or gas such as ambient air from the conduit system, i.e., the pressure reservoir 33 can be configured in a similar form as in conventional compressors.

Figure 3:
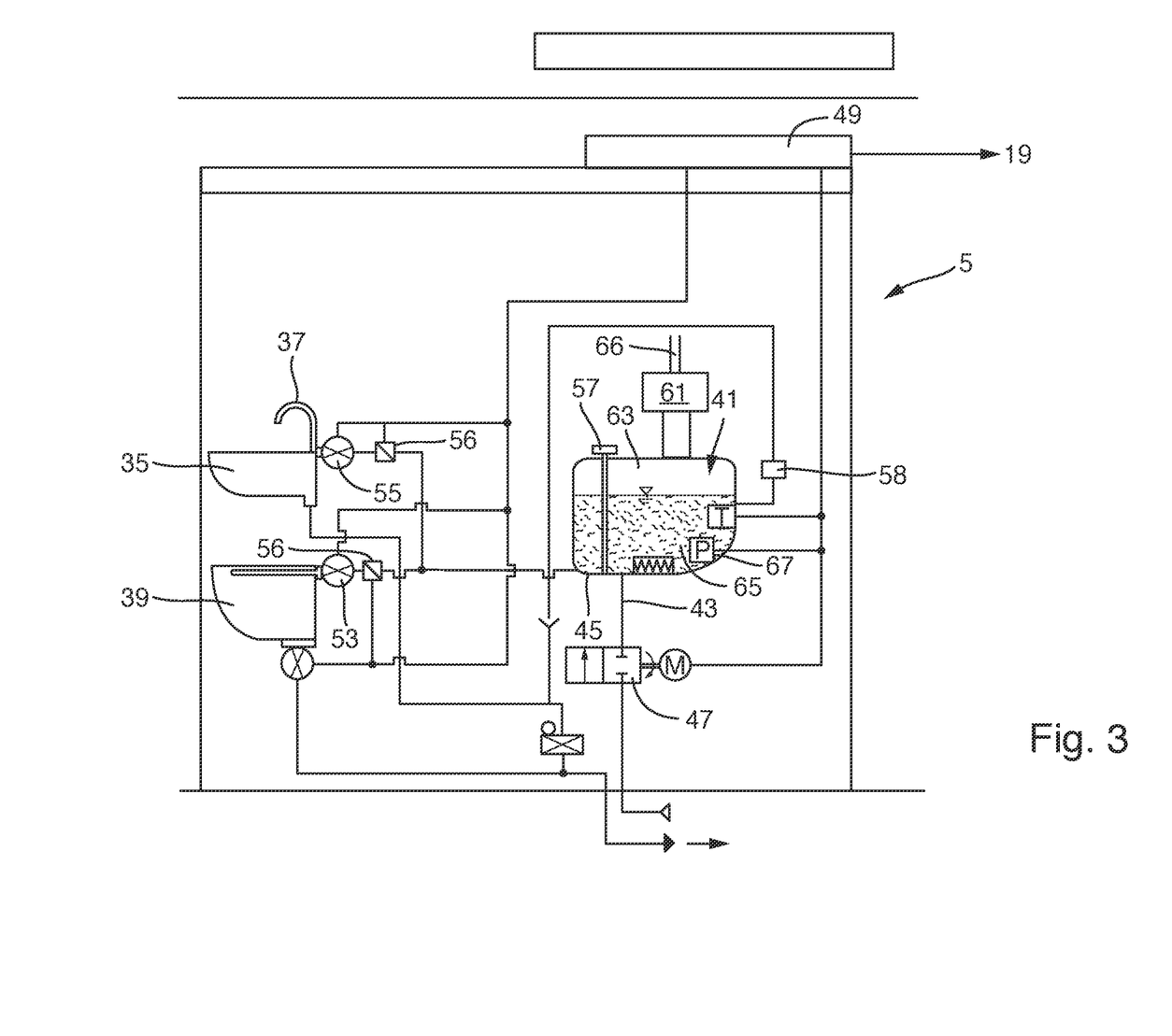
FIG. 3 shows a schematic drawing of an example embodiment of a consumer assembly of the on-board water supply and distribution system of FIG. 2.

The consumer assembly 5 shown in FIG. 3 is configured as a lavatory with a sink 35 provided with a faucet 37 and a toilet 39 as supply devices 7. Here, it is to be noted that other forms of consumer assemblies are conceivable such as galleys having sinks etc. and that the disclosure herein is not limited to consumer assemblies in the form of lavatories. In particular, since galleys are provided with buffer tanks that have a larger capacity than those of lavatories, the buffer tanks of galleys may play a more important role in the method of the disclosure herein, as will become clear below.

Furthermore, the consumer assembly 5 comprises a buffer tank 41 having an inlet 43 and an outlet 45, the inlet 43 being provided with an inlet valve 47 which is connected to a control device 49 which in turn is connected to the control unit 19 so that each of the consumer assemblies 5 can be controlled by and can send signals the control unit 19.

The position of the inlet valve 47 can be controlled by the control device 49. The outlet 45 is connected to the faucet 33 and the toilet 39. As can further be taken from FIG. 3, the line connecting buffer tank 41 with the toilet 39 is provided with a valve 53 that is controlled by the control device 49. Similarly, the line connecting the buffer tank 41 with the faucet 37 is also provided with a valve 55 connected to and controlled by the control device 49.

The buffer tank 41 of each consumer assembly 5 is provided with a level sensor 57 which is connected to the control device 49 and, hence, also to the control unit 19. The level sensor 57 is configured such that it provides a signal to the control device 49 indicating the fill level in the buffer tank 41. Furthermore, the buffer tanks 41 comprise an overpressure relief valve 58 which prevents that the pressure inside the buffer tanks 41 exceeds a maximum pressure which could cause damage to both the buffer tanks 41 and the conduit system attached to them.

The central tank 9 is also provided with a level sensor 59 that is connected to the control unit 19 so that the filling level in the central tank 9 can also electronically be determined by the control unit 19.

Moreover, in this preferred embodiment the buffer tank 41 of each of the consumer assemblies 5 is configured for holding both a gas and the water. In addition, a pressurizing device 61 is provided on the buffer tank 41 and further configured for increasing a pressure of the gas in the gas volume 63 of the buffer tank 41 to an operating pressure or maintaining the pressure of the gas in the gas volume 63 at the operating pressure when water is or has been drained from the water volume 65. Thus, the pressurizing device 61 is configured for applying a consumer pressure to the water kept in the buffer tank 41. In this regard it is to be noted that pressurizing devices 61 is provided with an intake conduit 66 so that fresh air from an uncontaminated area may be sucked in.

So, the pressure of water in the water volume 65 is kept at or increased to a consumer pressure. In particular, between the gas volume 63 and the water volume 65 a flexible membrane or other separation element (not shown) may be provided. The pressurizing device 61 can be in the form of a compressor, that is controlled by the control device 49 which in turn is coupled to a pressure sensor 67. The sensor 67 may by arranged in the water volume 65, as shown in FIG. 3, or in the gas volume 63 above the water level. Other configurations of the pressurizing device 61 are conceivable, as already indicated above.

Finally, the inlet 43 of the buffer tank 41 of each of the consumer assemblies 5 is connected to the downstream side 25 of the central pump 21 via the high-pressure conduit system 27 and the inlet valve 47, so that the buffer tanks 41 can be supplied with water by the central pump 21.

The control unit 19 of the system 1 in combination with the control device 49 of each of the consumer assemblies 5 are configured such that they operate the system 1 and especially the central pump 21 in this example embodiment in the following manner:

During normal operation the central pump 21 is constantly or intermittently operated in a supply mode so that water from the central tank 9 is delivered to the consumer assemblies 5 and their buffer tanks 41, which are connected to the downstream side 25 of the pump 21 via the high-pressure conduit system 27, so that the buffer tanks 41 of the consumer assemblies 5 are filled. In particular, in this step the inlet valves 47 of those consumer assemblies 5, the buffer tanks 41 of which shall be filled, are at the same time or subsequently brought into its open position. The level in the buffer tanks 41 may be monitored by the level sensors 57. Further, the water may be supplied from the buffer tank 41 to the faucet 37 or the toilet 39 by opening the respective valves 53, 55. In particular, the respective valve 53, 55 are opened and a passive pressurization element such as a membrane expands to maintain the pressure onto the water in the buffer tank 41. Alternatively, when the respective valve 53, 55 is opened, an active pressurization device 61, e.g., a compressor, a linear actuator acting on a piston, etc., is triggered via a signal from the pressure sensor 67 or the level sensor 57 on the buffer tank 41 so as to achieve that the pressure in the buffer tank 41 is maintained.

In addition, to ensure that the above described system is properly operating and no leaks or blockages are present in the entire system or at least that such leaks or blockages are detected at an early stage, the following safety procedures may be performed by the control unit 19 and the control devices 49 of the consumer assemblies 5 when starting the aircraft or during operation, with the control unit 19 and the control devices 49 being configured correspondingly:

Procedure 1:
Pressurizing gas, preferably ambient air, in the high-pressure conduit system 27 to a predetermined pressure, preferably by operating the central pump 21 such that the gas drawn in, e.g., via the fill drain coupling 15 or via an overflow line in the central water tank 9, and supplied to the high-pressure conduit system 27 is pressurized to a predetermined pressure monitored by the control unit 19 via the pressure sensor 31;
monitoring the pressure in the high-pressure conduit system 7 with the pressure sensor 31 for a predetermined period of time;
providing a corresponding failure signal by the control unit 19 to the aircraft data network ADN of the aircraft 3 when the pressure in the high-pressure conduit system 27 drops below a predetermined pressure within the period of time. In particular, a test-passed signal may be transmitted in case the pressure does not drop below the predetermined pressure within the period of time.

With this procedure it can simply be determined whether there is a leak in the high-pressure conduit system 27 without the high-pressure conduit system being filled with water.

In this procedure the connection between the buffer tank 41 of the consumer assembly 5 and the high-pressure conduit system 27, i.e., the inlet valve 47, may be in a closed position, i.e., the inlet valves 47 are switched to their closed position, after the water has been pressurized by the central pump 21.

It is also possible that the consumer assemblies 5 are operated such that for each of the consumer assemblies 5 the connection between the buffer tank 41 and the high-pressure conduit system 27, i.e., the inlet valve 47 is in an open position. The gas pressures are monitored in the buffer tanks 41 of each of the consumer assemblies 5 after a predetermined period of time and a failure signal is provided, when the difference between the monitored gas pressures in the buffer tanks 41 of two consumer assemblies 5 exceeds a predetermined pressure difference. Additionally, or as an alternative, a failure signal is provided, when the difference between the monitored gas pressure in the buffer tank 41 of one of the consumer assemblies 5 and the monitored gas pressure in the high-pressure conduit system 27 exceeds a predetermined pressure difference.

Alternatively, this procedure can also be performed such that for the consumer assemblies 5 the connection between the buffer tank 41 and the high-pressure conduit system 27, i.e., the inlet valves 47, are subsequently brought in the open position, so that at one point in time for only one of the consumer assemblies 5 the inlet valve 47 is in an open position, whereas for the remaining consumer assemblies 5 the inlet valve 47 is in a closed position.

For each of the consumer assemblies 5 when the inlet valve 47 is in the open position, the pressure in the high-pressure conduit system 27 is monitored for the above predetermined period of time, and the failure signal is provided, when for at least one of the consumer assemblies 5, the pressure in the high-pressure conduit system 27 drops below the predetermined fourth pressure within the period of time.

Hence, with this specific procedure the different paths from the central pump 21 to each of the buffer tanks 41 of the consumer assemblies 5 are inspected as to whether a leak is present in the respective path. If the latter is the case, the gas pressure in the system will drop below the pressure within the period of time and a failure signal will be provided and transmitted via the aircraft data network ADN. In the alternative, in case no significant pressure drop occurs in the period of time, again a test-passed signal may be provided.

Procedure 2:
  Monitoring the level in the central tank 9, e.g., via the level sensor 59, when the central pump 21 is not operated so that it does not convey water from the upstream side 23 to the downstream side 25 and preferably when the alignment of the aircraft is constant, i.e., when roll and pitch are constant; and
  providing a corresponding failure signal by the control unit 19 when the level in the central water tank decreases by more than a predetermined amount within a predetermined period of time.

This procedure allows to determine whether the central tank 9 and the supply line 13 to the central pump 21 comprise any leakages. In case the level in the central tank 21 decreases by more than the predetermined amount, the corresponding failure signal is generated and supplied to the aircraft data network ADN.

Procedure 3:
  Operating the central pump 21 by the control unit 19 such that water in the high-pressure conduit system 27 is pressurized to a predetermined pressure;
  monitoring the pressure in the high-pressure conduit system 27 for a predetermined period of time by the pressure sensor 31; and
  providing a corresponding failure signal by the control unit 19 to the aircraft data network ADN when the pressure in the high-pressure conduit system 27 drops below a predetermined pressure within the period of time.

With this procedure it can also simply be determined whether there is a leak in the high-pressure conduit system 27. However, this test may also be performed during normal operation, because different from Procedure 1 it is not required that the high-pressure conduit system is filled with gas instead of water.

In this procedure the inlet valve 47 may be in a closed position, i.e., the inlet valves 47 are switched to their closed position, after the water has been pressurized by the central pump 21.

It is also possible that the consumer assemblies 5 are operated such that for each of the consumer assemblies 5 the connection between the buffer tank 41 and the high-pressure conduit system 27, i.e., the inlet valve 47 is in an open position. The pressures are monitored in the buffer tanks 41 of each of the consumer assemblies 5 after a predetermined period of time and a failure signal is provided, when the difference between the monitored pressures in the buffer tanks 41 of two consumer assemblies 5 exceeds a predetermined pressure difference. Additionally, or as an alternative, a failure signal is provided, when the difference between the monitored pressure in the buffer tank 41 of one of the consumer assemblies 5 and the monitored pressure in the high-pressure conduit system 27 exceeds a predetermined pressure difference. Alternatively, this procedure can be performed such that for the consumer assemblies 5 the connection between the buffer tank 41 and the high-pressure conduit system 27, i.e., the inlet valves 47, are subsequently brought in the open position, so that at one point in time for only one of the consumer assemblies 5 the inlet valve 47 is in an open position, whereas for the remaining consumer assemblies 5 the inlet valve 47 is in a closed position.

For each of the consumer assemblies 5 when the inlet valve 47 is in the open position, the water pressure in the high-pressure conduit system 27 is monitored for the above predetermined period of time. The failure signal is provided, when for at least one of consumer assemblies 5, the pressure in the high-pressure conduit system 27 drops below the predetermined pressure within the period of time.

Therefore, the different paths from the central pump 21 to each of the buffer tanks 41 of the consumer assemblies 5 are inspected with this specific procedure as to whether a leak is present in the respective path. If the latter is the case, the water pressure in the system will drop below the pressure within the period of time and a failure signal will be provided and transmitted via the aircraft data network ADN. In the alternative, in case no significant pressure drop occurs in the period of time, again a test-passed signal may be provided.

With this procedure the paths from the central pump 21 to the respective buffer tanks 41 can be inspected during normal use of the system, since the medium that is employed is water, which is present in the system anyway.

Procedure 4:
  Operating the central pump 21 such that water is conveyed from the upstream side 23 to the downstream side 25, into the high-pressure conduit system 27 and into the buffer tank 41 of one of the consumer assemblies 5;
  monitoring, e.g., by the control devices 49 and level sensor 57 or pressure sensor 67, whether the level in the buffer tank 41 of the one of the consumer assemblies 5 increases by more than a predetermined first filling level difference via the level sensors 57;
  providing a corresponding failure signal when the level in the buffer tank 41 of the one of the consumer assemblies 5 has not increased by the predetermined filling level difference within a predetermined period of time, preferably wherein the flow of water from the upstream side 23 to the downstream side 25 and into the high-pressure conduit system 27 is monitored by the control unit 19 and the flow sensor 29 so that the predetermined period of time is calculated by the control unit 19 based on the monitored flow of water from the upstream side 23 to the downstream side 25 and into the high-pressure conduit system 27.

Firstly, this procedure allows to determine whether in at least one of the consumers assemblies 5 a leak is present. Further, this procedure generally allows, in combination with the simple embodiment of Procedures 1 or 3, i.e., where the inlet valves 47 are not subsequently opened, to determine in which path to the consumer assemblies 5 a leak is present when a failure signal was generated by Procedure 1 or 3. For this purpose, the procedure has to be carried out with the buffer tank 41 of each of the consumer assemblies 5 subsequently being filled until a failure signal is generated (see Procedure 6). In addition, if Procedures 1 or 2 do not identify a leak but in Procedure 4 the predetermined filling level difference is not achieved, a partial or total blockage can also be present upstream or downstream the central pump 21.

Procedure 5:
  Operating the central pump 21 by the control unit 19 such that water is conveyed from the upstream side 23 to the downstream side 25, into the high-pressure conduit system 27 and into the buffer tank 41 of at least one of the consumer assemblies 5;
  monitoring whether the level in the buffer tank 41 of the at least one of the consumer assemblies 5 increases by a predetermined filling level difference via the control device 49 and the level sensor 57;

stopping operation of the central pump 21 by the control unit 19 and preferably closing the inlet valve 47, when the level in the buffer tank 41 of the at least one of the consumer assemblies 5 has increased by the predetermined filling level difference; further the valves 53, 55 in the conduits to the supply devices 37, 39 are also closed;

monitoring whether the level in the buffer tank 41 of the at least one of the consumer assemblies 5 decreases by a predetermined filling level difference by the level sensor 57 and the control device 49; and providing a corresponding failure signal to the aircraft data network ADN by the control unit 19 when the level in the buffer tank 41 of the at least one of the consumer assemblies 5 has decreased by the predetermined filling level difference within a predetermined period of time.

This procedure allows to check whether there is any leakage in the monument comprising that consumer assembly 5 the level in the buffer tank 41 is monitored.

Procedure 6:

Operating the central pump 21 such that water is conveyed from the upstream side 23 to the downstream side 25, into the high-pressure conduit system 27 and into the buffer tank 41 of each of the consumer assemblies 5, wherein the buffer tanks 41 are subsequently filled such that at one point in time only one of the consumer assemblies 5 is supplied with water;

monitoring whether the level in the buffer tank 41 of each of the consumer assemblies 5 increases by a predetermined filling level difference; and providing a failure signal when for at least one of the consumer assemblies 5 the time between the start of the filling of its buffer tank 41 and of reaching the predetermined first filling level difference exceeds the predetermined period of time.

In order to determine the respective period of time the flow rate to the buffer tank 41 is required. Here, a nominal value of the central pump 21 may be the basis or the flow rate may be derived from the current pressure value in the high-pressure conduit system 27. Finally, the signal of the flow sensor 29 arranged at the downstream side 25 of the central pump 21 may be used for this purpose.

When combined with Procedure 5, this procedure allows to check whether any blockages are in the path between the central pump 21 to the buffer tank 41 of each of the consumer assemblies 5, because the respective test is conducted for each of the consumer assemblies 5 separately.

However, for confirming that a leak or blockage is present in that region it is additionally required that a certain minimum pressure of the pump 21 is reached. Otherwise, the pump 21 could also be damaged or it could have a leak.

Procedure 7a:

Operating the central pump 21 by the control unit 19 such that water is conveyed from the upstream side 23 to the downstream side 25 and into the high-pressure conduit system 27;

monitoring the pressure in the high-pressure conduit system 27 for a predetermined period of time by the control unit 19 via the pressure sensor 31; and providing a corresponding failure signal by the control unit 19 to the aircraft data network ADN when the pressure in the high-pressure conduit system 27 remains below a predetermined pressure within the predetermined period of time.

When Procedures 5 and 6 have subsequently been conducted before and no failure signals were generated, i.e., no leaks and or blockages were detected downstream the central pump 21, this procedure allows to check whether any blockages are present in the path between the central tank 9 and the central pump 21 and whether the pump 21 is operating properly.

Procedure 7b:

Operating the central pump 21 by the control unit 19 such that water is conveyed from the upstream side 23 to the downstream side 25 and into the high-pressure conduit system 27;

monitoring the flow of water from the upstream side 23 to the downstream side 25 and into the high-pressure conduit system 27 with the inlet valves 47 of the buffer tanks 41 in an open position for a predetermined period of time by the control unit 19 and the flow sensor 29;

providing a corresponding failure signal by the control unit 19 to the aircraft data network ADN when the flow of water from the upstream side 23 to the downstream side 25 and into the high-pressure conduit system 27 remains below a predetermined flow level within the predetermined period of time.

Similar to Procedure 7a, this procedure also allows to check whether any blockages are present in the path between the central tank 9 and the central pump 21, when combined with Procedure 6. In addition, it is monitored whether the pump 21 is operating in the right manner. Further it is to be noted, that the flow of water through the central pump 21 can be measured by the flow sensor 29 or inverse methods may also be used such as detecting the rotational speed of the central pump 21 to derive the flow if the pressure is measured by the pressure sensor 31 downstream the central pump 21.

Procedure 8:

Operating the central pump 21 such that water is conveyed from the upstream side 23 to the downstream side 25 and into the high-pressure conduit system 27;

monitoring the flow of water from the upstream side 23 to the downstream side 25 and into the high-pressure conduit system 27 for a predetermined period of time;

operating a first group of the consumer assemblies 5 such that the inlet valve 47 is open during the predetermined period of time, so that water is supplied to the buffer tank 41 of the consumer assemblies 5 of the first group;

operating a second group of the consumer assemblies 5 such that water is supplied from the buffer tank 41 via the supply device 7 of the consumer assemblies 5 of the second group with the flow of supplied water through the supply device 7 being monitored during the predetermined period of time, e.g., by monitoring the level change in the respective buffer tank 41, via operating parameters of the associated supply device 7, with a flow sensor 56 associated to the supply device 7 or on the basis of a nominal flow value of the respective supply device 7;

monitoring the level in the buffer tanks 41 of the consumer assemblies 5 of the first and the second group of consumer assemblies during the predetermined period of time;

determining from the change of the monitored level in the buffer tank 41 of the consumer assemblies 5 of the first and the second group of consumer assemblies 5 the total change of the amount of water received in the buffer tanks 41 of the consumer assemblies 5 in the predetermined period of time;

determining by the control unit 19 from the monitored flow of water from the upstream side 23 to the downstream side 25 the total amount of water supplied by the central pump 21 to the consumer assemblies 5 in the predetermined period of time;

determining from the monitored flow of supplied water from the buffer tanks 41 through the supply device of the consumer assemblies 5 of the second group of consumer assemblies 5 the amount of water supplied by the consumer assemblies 5 in the predetermined period of time; and providing a failure signal when the change of the amount of water received in the buffer tanks 41 in the predetermined period of time differs from the total amount of water supplied by the central pump 21 minus the amount of water supplied by the second group of consumer assemblies 5 in the period of time by more than a predetermined value.

This procedure also allows to determine whether in the path between the central pump 21 and the supply device 7 of the one consumer assembly 5 leaks are present.

Procedure 9:

Operating the central pump 21 such that water is conveyed from the upstream side 23 to the downstream side 25, into the high-pressure conduit system 27 and into the buffer tank 41 one of the consumer assemblies 5;

operating the consumer assembly 5 such that the connection between the buffer tank 41 and the high-pressure conduit system 27, i.e., the inlet valve 47, is brought in a closed position, wherein the water in the buffer tank 41 of the consumer assembly 5 is kept at the consumer pressure by the pressurizing device 61; depending of the type of pressurization device 61 it needs to be activated first in order to maintain the pressure level in the buffer tank 41;

monitoring the pressure in the buffer tank 41 of the consumer assembly 5 while the supply device 7 of the consumer assembly 5 is kept in a closed position; and providing a fourth failure signal when the pressure in the buffer tank 41 of the consumer assembly 5 drops below a predetermined pressure below the consumer pressure within a predetermined period of time.

With this preferred embodiment the buffer tank 41 is checked whether there is any kind of leakage. In addition, it is also checked whether the pressurization device 61 operates properly. If malfunctioning is detected a further failure signal will be generated and transmitted via the aircraft data network ADN. On the other hand, if the pressure drop is above the predetermined value, a test-passed signal may again be generated.

Therefore, with Procedure 9 it is possible to check whether buffer tanks 41 or the piping between the buffer tanks 41 and the respective supply device 7 have any leaks and whether the pressurization 61 are malfunctioning.

Procedure 10:

Operating the central pump 21 such that water in the high-pressure conduit system 27 is pressurized to a predetermined first pressure;

operating the consumer assemblies 5 such that for each of the consumer assemblies 5 the connection between the buffer tank 41 of the consumer assembly 5 and the high-pressure conduit system 27, i.e., the inlet valve 47, is in an open position;

monitoring the pressures in the buffer tanks 41 of each of the consumer assemblies 5 after a first predetermined period of time; and providing a failure signal, when the difference between the monitored pressures in the buffer tanks 41 of two consumer assemblies 5 exceeds a first pressure difference.

This procedure allows again by making use of the pressurizing device 61 in the consumer assemblies 5 that maintain a pressure in the buffer tanks 41 and, due to the open inlet valves 47, also in the high-pressure conduit system 27, that it can be checked whether any of the consumer assemblies 5 or the high-pressure conduit system 27 comprises a leakage. However, it is required that the central pump 21 has a backflow prevention.

Procedure 11:

For this procedure the pressurizing devices 61 of the consumer assemblies 5 are configured for increasing a pressure of the water in the buffer tanks 41 to an operating pressure and maintaining the pressure of the water at the operating pressure when water is or has been drained from the buffer tank (41), e.g., the pressurizing devices are configured as compressors;

Operating a consumer assembly 5 for a predetermined time interval such that the pressurising device 61 of the consumer assembly 5 increases the pressure in the buffer tank 41 towards the operating pressure, while the supply device 7 of the consumer assembly 5 is in the closed position, and that the connection between the buffer tank 41 and the high-pressure conduit system 27, i.e., the inlet valve 47, is in the closed position;

monitoring the pressure in the buffer tank 41 of the consumer assembly 5 after expiry of the time interval; and providing a failure signal when the pressure in buffer tank 41 is below the operating pressure after expiry of a further period of time after expiry of the time interval by more than a predetermined value.

Finally, this procedure allows by employing the pressurizing device 61 in the consumer assemblies 5 to check whether any of the consumer assemblies 5 comprises a leakage.

Procedure/Logic 12a:

Pressurizing gas, such as ambient air, in a consumer assembly 5 in its line connecting the supply device 7, such as the faucet 37 or the toilet 39, to the high-pressure conduit system 27; in particular, the gas may be pressurized by the pressurization device 61 of the consumer assembly 5;

monitoring the pressure in the line connecting the supply device 7 of the consumer assembly 5 to the buffer tank 41, e.g. via the sensors 67, for a predetermined period of time; and providing a failure signal when the pressure in the line connecting the supply device 7 of the consumer assembly 5 to the buffer tank 41 drops below a predetermined pressure within the period of time.

With this procedure it can be tested, preferably when the valve 53, 55 of the supply device 7 such as the toilet 39 or the faucet 37 are in a closed position, whether there is a leak in the conduits of the consumer assembly 5. When it is detected that the gas pressure in the pressurized conduit drops below the predetermined threshold, a corresponding failure signal is generated and transmitted through the aircraft data network (ADN).

Procedure/Logic 12b:

Operating the pressurization device 61 of a consumer assembly 5 such that water in the line connecting the buffer tank 41 and the supply device 7, such as the faucet 37 or the toilet 39, of the consumer assembly 5 is pressurized to a predetermined pressure;

monitoring the pressure in the line connecting the buffer tank 41 and the supply device 7 of the consumer assembly 5, e.g. via the sensor 67 for a predetermined period of time; and providing a failure signal, e.g., via the aircraft data network ADN, when the pressure in the line connecting the buffer tank 41 and the supply device 7 of the consumer assembly 5 drops below a predetermined pressure within the period of time.

In this procedure the consumer assembly 5 in question is tested by pressurizing the water in the conduits whether there is a leak. In case a pressure drop is detected after the pressurization device 61 was switched off, this indicates the presence of a leak. In such case the corresponding failure signal is transmitted through the aircraft data network (ADN).

Procedure/Logic 12c:

Operating the pressurization device 61 such that water is conveyed in the line connecting the supply device 7 of a consumer assembly 5, such as the faucet 37 or the toilet 39, to the high-pressure conduit system 27 or the buffer tank 41;

monitoring the pressure in the line connecting the supply device 7 of the consumer assembly 5 to the high-pressure conduit system 27 or the buffer tank 41, e.g., via sensor 56, for a predetermined period of time; and providing a failure signal when the pressure in the line connecting the supply device 7 of the consumer assembly 5 to the high-pressure conduit system 27 or buffer tank 41 remains below a predetermined pressure within the period of time.

With this procedure it is tested with whether the pressurization device 61 of the consumer assembly 5 in question is operating properly, i.e., whether it is capable of building up a sufficient pressure in the buffer tank 41. In case a sufficient pressure level cannot be reached, a corresponding failure signal will be generated and transmitted via the aircraft data network (ADN).

Procedure/Logic 12d:

Operating the pressurization device 61 such that water is conveyed in the line connecting the supply device 7 of a consumer assembly 5, such as the faucet 37 or the toilet 39, to the buffer tank 41;

monitoring the flow in the line connecting the supply device 7, such as the faucet 37 or the toilet 39, to the buffer tank 41; and providing a failure signal when the flow in the line connecting the supply device 7 of the consumer assembly 5 to the buffer tank 41 remains below a predetermined second flow level within the period of time.

With this embodiment it is again tested with whether the pressurization device 61 of the consumer assembly 5 in question is also operating properly, i.e., whether it is capable of providing a sufficient pressure and hence flow in the conduit between the buffer tank 41 and the supply device 7, or whether there is a blockage in that conduit. In case such sufficient flow level cannot be reached, a corresponding failure signal will be generated and transmitted via the aircraft data network (ADN).

Figure 4:
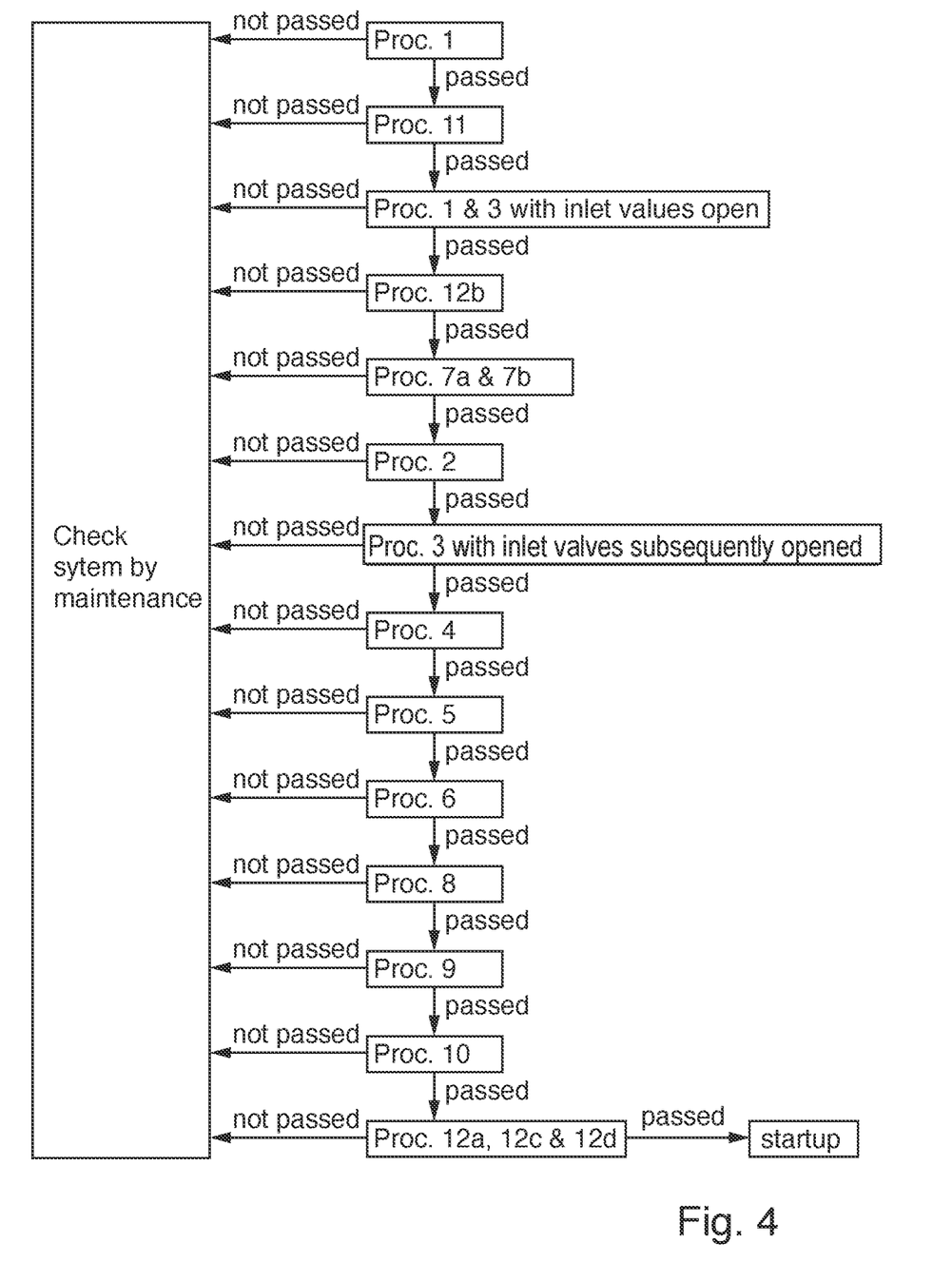
FIG. 4 a flow chart of an example embodiment of a method of the disclosure herein.

In a further embodiment, the afore-mentioned procedures can be combined to the following test procedure to be run during system start-up or as a general system test procedure (see FIG. 4). However, it is to be noted that other combinations and sequences of the procedures may be employed as start-up or system test procedure.

In this embodiment, the start-up or system test procedure starts with Procedure 1, and when the gas pressure in the high-pressure conduit system 27 does not drop below a predetermined pressure and the test is passed, the procedure proceeds to the next step where above Procedure 11 is conducted. In case, Procedure 1 is not passed, i.e., there is a pressure drop which is too large, the routine stops and the entire system has to be checked in a maintenance procedure as indicated in the left part of a FIG. 4.

This generally applies to any of the following steps. Whenever a test is not passed the procedure stops and a maintenance is required (left part).

When Procedure 11 was successfully conducted, i.e., a sufficient pressure buildup could be obtained which is also maintained over a predetermined period of time, the procedure continues to the next step, where Procedures 1 and 3 are conducted with the inlet valves 47 of the consumer assemblies 5 being in the open position, so as to test whether the signals delivered by different pressure sensors 31, 67 are in agreement with each other and the sensors 31, 67 are working correctly. In case, this test is passed, the procedure continues to the next step where above Procedure 12b is performed.

In the following Procedures 7a and 7*b* are performed in the next step. Then Procedure 2 is conducted in a further step. In the next step the already mentioned Procedure 3 is performed but with the inlet valves 47 being subsequently opened as discussed above.

In the following steps Procedures 4, 5, 6, 8, 9, and 10 are subsequently conducted.

In the final step the consumer assemblies 5 and especially the pressurization devices 61 are further tested via Procedures 12a, 12c and 12d. When this final test is passed, the procedure proceeds to the remaining startup.

During system operation, the above Procedures 1 to 12d can be run at predefined times or continuously as soon as the test conditions are met.

For example, the central pump 21 conveys water and re-fills the buffer tanks 41 of the consumer assemblies so that those of the above test procedures can be run, when operation of the central pump 21 is required. On the other hand, if the system is not in use or operated without running the central pump 21, because the consumer water supply is at such a low level that buffer tanks 41 do not need to be re-filled, those tests procedures can be run that require the central pump 21 being operated.

However, the consumer water supply has priority, i.e. if a consumer assembly 5 requests for water during a test, the test procedure is interrupted and restarted as soon as the test conditions are met again.

Moreover, it is to be noted that in another preferred embodiment only a subset of the procedures will be conducted during aircraft start-up in order to be fast and efficient. At the same time, certain tests can also be carried out after a predefined time period has elapsed, for example every 10 days or e.g. every 20 flight cycles.

However, a system test can also be initiated by the cabin crew via the flight attendant panel or by the flight crew via the aircraft maintenance system in case they assume a leak or a malfunction of the water system 1 for example an abnormal low water tank capacity or low water pressure at the point of use.

In case a failure is detected in one of the above steps, the crew is informed and automated actions are possible as already indicated, e.g., switching off the central pump 21, close inlet valves 41 etc. In addition, manual crew actions may also be required after the crew has been informed, e.g., verify failures, and disable/close lavatories.

It can be taken from the above description of the preferred embodiments, that the disclosure herein provides for an efficient method to check the status of an on-board water supply and distribution system without the need to visually inspect such system.

While at least one example embodiment of the invention(s) is disclosed herein, it should be understood that modifications, substitutions and alternatives may be apparent to one of ordinary skill in the art and can be made without departing from the scope of this disclosure. This disclosure is intended to cover any adaptations or variations of the example embodiment(s). In addition, in this disclosure, the terms "comprise" or "comprising" do not exclude other elements or steps, the terms "a", "an" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

REFERENCE NUMERALS 1 water supply and distribution system
3 aircraft
5 consumer assembly
7 supply device
9 central water tank
11 connector
13 supply line
15 fill/drain coupling
17 valve
19 control unit
21 central pump
23 upstream side-pump
25 downstream side-pump
27 high-pressure conduit system
29 flow sensor
31 pressure sensor
33 pressure reservoir
35 sink
37 faucet
39 toilet
41 buffer tank
43 inlet
45 outlet
47 inlet valve
49 control device
53 valve
55 valve
56 flow sensor
57 level sensor
58 over pressure relief valve
59 level sensor
61 pressurizing device
63 gas volume
65 water volume
66 intake conduit
67 pressure sensor

The invention claimed is:

1. A method for operating an on-board water supply and distribution system of an aircraft for supplying water, the system comprising:
a central water tank;
a central pump that has an upstream side and a downstream side, wherein the central pump is for conveying and pressurizing water from the upstream side to the downstream side;
consumer assemblies, each comprising a supply device and a buffer tank; and
a high-pressure conduit system that connects the downstream side with the consumer assemblies, wherein the high-pressure conduit system is configured such that the central pump, when operating, is for delivering water from the downstream side to the buffer tank of each of the consumer assemblies;
wherein the buffer tank of each of the consumer assemblies comprises a pressurizing device for applying a consumer pressure to water kept in the buffer tank;
wherein each of the consumer assemblies supplies water from the buffer tank via the supply device;
wherein the central water tank is connected to the upstream side;
the method comprising:
operating the central pump such that water in the high-pressure conduit system is pressurized to a predetermined first pressure;
monitoring pressure in the high-pressure conduit system for a predetermined first period of time; and
providing a first failure signal when the pressure in the high-pressure conduit system drops below a predetermined second pressure within the first period of time.

2. The method according to claim 1, wherein the consumer assemblies are operated such that, for each of the consumer assemblies, a connection between the buffer tank of the consumer assembly and the high-pressure conduit system is in a closed position.

3. The method according to claim 1, wherein:
the consumer assemblies are operated such that, for each of the consumer assemblies, a connection between the buffer tank of the consumer assembly and the high-pressure conduit system is in an open position;
pressures in the buffer tanks of each of the consumer assemblies are monitored for a second period of time; and
a second failure signal is provided when a difference between the monitored pressures in the buffer tanks of two of the consumer assemblies exceeds a first pressure difference.

4. The method according to claim 1, wherein:
the consumer assemblies are operated such that, for each of the consumer assemblies, a connection between the buffer tank of the consumer assembly and the high-pressure conduit system is in an open position;
pressures in the buffer tanks of each of the consumer assemblies and in the high-pressure conduit system are monitored for a second period of time; and
a second failure signal is provided when a difference between the monitored pressure in the buffer tank of one of the consumer assemblies and the monitored pressure in the high-pressure conduit system exceeds a first pressure difference.

5. The method according to claim 1, wherein:
the consumer assemblies are operated such that, for the consumer assemblies, connections between the buffer tank and the high-pressure conduit system are subsequently brought in an open position so that, at one point in time:

for only one of the consumer assemblies, the connection between the buffer tank of the consumer assembly and the high-pressure conduit system is in an open position; and for remaining consumer assemblies, the connection between the buffer tank of the consumer assembly and the high-pressure conduit system is in a closed position, for each of the consumer assemblies, when the connection between the buffer tank and the high-pressure conduit system is in the open position, pressure in the high-pressure conduit system is monitored for the predetermined first period of time; and the first failure signal is provided when, for at least one of the consumer assemblies, the pressure in the high-pressure conduit system or pressure in the buffer tank of the consumer assembly with the connection in the open position drops below the predetermined second pressure within the first period of time.

6. The method according to claim 4, wherein the first failure signal is provided when, for at least one of the consumer assemblies, the pressure in the high-pressure conduit system differs from the pressure in the buffer tank of the consumer assembly with the connection in the open position by more than a second pressure difference within the first period of time.

7. The method according to claim 1, comprising:
pressurizing gas in the high-pressure conduit system to a predetermined third pressure;
monitoring pressure in the high-pressure conduit system for a predetermined third period of time; and
providing a third failure signal when the pressure in the high-pressure conduit system drops below a predetermined fourth pressure within the third period of time.

8. The method according to claim 7, comprising operating the consumer assemblies such that, for each of the consumer assemblies, a connection between the buffer tank of a corresponding one of the consumer assemblies and the high-pressure conduit system is in a closed position.

9. The method according to claim 7, comprising:
operating the consumer assemblies such that, for each of the consumer assemblies, a connection between the buffer tank of a corresponding one of the consumer assemblies and the high-pressure conduit system is in an open position;
monitoring pressures in the buffer tanks for a fourth period of time; and
providing a fourth failure signal when a difference between the monitored pressures in the buffer tanks of two of the consumer assemblies exceeds a third pressure difference.

10. The method according to claim 7, comprising:
operating the consumer assemblies such that, for each of the consumer assemblies, a connection between the buffer tank of a corresponding one of the consumer assemblies and the high-pressure conduit system is in an open position;
monitoring pressures in the buffer tanks and in the high-pressure conduit system for a fourth period of time; and
providing a fourth failure signal when a difference between the monitored pressure in the buffer tank of any of the consumer assemblies and the monitored pressure in the high-pressure conduit system exceeds a fourth pressure difference.

11. The method according to claim 7, wherein:
the consumer assemblies are operated such that, for the consumer assemblies, a connection between the buffer tank and the high-pressure conduit system is subsequently brought in an open position, so that, at one point in time;

for only one of the consumer assemblies, the connection between the buffer tank of the consumer assembly and the high-pressure conduit system is in the open position; and for remaining consumer assemblies, the connection between the buffer tank of the consumer assembly and the high-pressure conduit system is in a closed position;

for each of the consumer assemblies, when the connection between the buffer tank and the high-pressure conduit system is in the open position, pressure in the high-pressure conduit system is monitored for the predetermined third period of time; and the third failure signal is provided when, for at least one of the consumer assemblies, the pressure in the high-pressure conduit system or pressure in the buffer tank of the consumer assembly with the connection in the open position drops below the predetermined fourth pressure within the third period of time.

12. The method according to claim 11, wherein the third failure signal is provided when, for at least one of the consumer assemblies, the pressure in the high-pressure conduit system differs from the pressure in the buffer tank of the consumer assembly with the connection in the open position by more than a fourth pressure difference within the third period of time.

13. The method according to claim 1, comprising:
operating the central pump such that water is conveyed from the upstream side to the downstream side, into the high-pressure conduit system, and into the buffer tank of at least one consumer assembly of the consumer assemblies;
operating the at least one consumer assembly such that a connection between the buffer tank of the at least one consumer assembly and the high-pressure conduit system is in a closed position, wherein the water in the buffer tank of the at least one consumer assembly is kept at the consumer pressure by the pressurizing device;
monitoring pressure in the buffer tank of the at least one consumer assembly while the supply device of the at least one consumer assembly is kept in a closed position; and
providing a fifth failure signal when the pressure in the buffer tank of the at least one consumer assembly drops below a predetermined fifth pressure, which is below the consumer pressure, within a fifth period of time.

14. The method according to claim 1, wherein the pressurizing devices of the consumer assemblies are configured for increasing a pressure of the water in the buffer tanks to an operating pressure and maintaining the pressure of the water at the operating pressure when the water is draining from the buffer tank or has been drained from the buffer tank;
the method comprising:
operating at least one consumer assembly of the consumer assemblies for a predetermined time interval such that:
the pressurizing device of the at least one consumer assembly increases the pressure in the buffer tank of the at least one consumer assembly towards the operating pressure, while the supply device of the at least one consumer assembly is in a closed position; and a connection between the buffer tank of the at least one consumer assembly and the high-pressure conduit system is in the closed position;

monitoring pressure in the buffer tank of the at least one consumer assembly after expiry of the predetermined time interval; and providing a sixth failure signal when the pressure in buffer tank of the at least one consumer assembly is below the operating pressure after expiry of a sixth period of time by more than a predetermined value.

15. The method according to claim 1, comprising:

operating the central pump such that water is conveyed from the upstream side to the downstream side, into the high-pressure conduit system, and into the buffer tank of at least one of the consumer assemblies;

monitoring whether a level in the buffer tank of the at least one consumer assembly exceeds a predetermined first filling level;

stopping operation of the central pump or closing a connection between the at least one consumer assembly and the high-pressure conduit system when the level in the buffer tank of the at least one consumer assembly exceeds the predetermined first filling level;

monitoring whether the level in the buffer tank of the at least one of the consumer assembly falls below a predetermined second filling level; and providing a seventh failure signal when the level in the buffer tank of the at least one the consumer assembly is below the predetermined second filling level within a predetermined seventh period of time.

16. An on-board water supply and distribution system of an aircraft configured to perform the method of claim 1.

17. The method of claim 7, wherein the gas is in a form of ambient air in the high-pressure conduit system.

* * * * *